United States Patent [19]

Lyon

[11] Patent Number: 5,076,328

[45] Date of Patent: Dec. 31, 1991

[54] PRESSURE RELIEF VALVE ASSEMBLY

[75] Inventor: David L. Lyon, Buffalo, Minn.

[73] Assignee: Cherne Industries Incorporated, Minneapolis, Minn.

[21] Appl. No.: 666,347

[22] Filed: Mar. 8, 1991

[51] Int. Cl.⁵ .......................................... F16L 55/128
[52] U.S. Cl. ....................... 138/93; 137/540; 137/543.21
[58] Field of Search .............. 137/543.17, 543.21, 137/540; 138/90, 93

[56] References Cited

U.S. PATENT DOCUMENTS

| | | | |
|---|---|---|---|
| 1,180,282 | 4/1916 | Bunn | 138/90 |
| 4,614,206 | 9/1986 | Mathison | 138/90 X |
| 4,790,356 | 12/1988 | Tash | 138/93 |
| 4,865,136 | 9/1989 | White | 137/543.21 |
| 4,889,151 | 12/1989 | Oten | 137/543.17 |

FOREIGN PATENT DOCUMENTS

| | | | |
|---|---|---|---|
| 501420 | 4/1954 | Canada | 137/540 |
| 1371514 | 10/1974 | United Kingdom | 137/543.21 |

Primary Examiner—Robert G. Nilson
Attorney, Agent, or Firm—Anthony G. Eggink

[57] ABSTRACT

An adjustable pressure relief valve for use in a fluid pressurized system. The pressure relief valve has a valve body with a passage that terminates at inlet and outlet ends. The passage includes a valve chamber, a valve seat at the inlet end, and a valve base adjustably secured proximate the outlet end. A valve head sealingly engages the valve seat by a spring that is interposed between the valve head and the valve base. The valve body is constructed and arranged for use as an end cap in a flexible pressurized system, such as a pneumatic pipeline plug.

19 Claims, 3 Drawing Sheets

PRESSURE RELIEF VALVE ASSEMBLY

BACKGROUND OF THE INVENTION

This invention relates generally to pressure relief valves, and more particularly, to pressure relief valve assemblies for use in pneumatic pipeline plugs.

Pressure relief devices are typically designed to prevent over pressurization of a system by allowing the escape of a fluid, such as gas or liquid. Pressure relief valves are typically designed to relieve fluid pressure from a system at a specified pressure limit and to reclose when the system pressure returns to that pressure limit.

Pressure relief valves are most often designed for specific applications and uses in constant or fixed volume systems. In relief valves used in flexible systems and those in systems having the potential of repeated use it is of increased importance to provide valve reliability. For example, repeatability of cracking and reseating pressures are important in these pressure relief valve structures.

Pneumatic plugs are monitored during inflation and use with a pressure gauge, the valve of this invention further ensures the integrity of the pneumatic plug. Although pressure relief structures have been designed in the past for use in pneumatic plugs, they have typically been designed to function in cooperation with other elements of the plug body itself. These prior art valve structures and the use of known pressure relief valve designs have been found to yield low fluid flow characteristics, inconsistent reseating results, to be difficult to adjust and expensive to manufacture.

The pressure relief valves of this invention are designed to be incorporated in a flexible pressurized system and particularly in pneumatic pipeline plugs. Pneumatic plugs are used in the plumbing industry, for example, to seal pipelines and other conduits. These plug devices expand upon the introduction of a pressurized fluid, such as air or water, to seal against the interior wall of the pipe. These pneumatic plugs are flexible pressurized systems which operate at relatively low fluid pressure ranges. The relief valve structures, therefore, require specific requirements including reliability, repeatability, economy and ease of manufacture.

Despite the need for a functional and inexpensive pressure relieve valve device in the art which can be incorporated into pneumatic plugs, and which overcomes the limitations and problems of the prior art, none insofar as is known has been proposed or developed.

Accordingly, it is an object of the present invention to provide an efficient and inexpensive pressure relief valve for pneumatic plugs. The pressure relief valve of this invention has a structure that provides a large area for fluid flow in a relatively small diameter valve size and provides repeatable reseat characteristics. Particularly provided is a relief valve structure which is integral with an end cap assembly for pneumatic test plugs, which can be preset during manufacture and assembly and which is tamper resistant in the field.

SUMMARY OF THE INVENTION

The present invention provides an adjustable, tamper-resistant pressure relief valve assembly for use in a fluid pressurized system. The pressure relief valve comprises a valve body constructed and arranged for securement in the pressurized system and particularly in a flexible system, such as a pneumatic plug. A passage extends through the valve body and terminates in inlet and outlet ends. The passage includes a valve chamber located between the inlet and outlet ends. A valve seat is disposed at the inlet end of the passage and an adjustable valve base is provided in the passage towards the outlet end. The outlet end of the passage includes a threaded interior portion and the valve base has a threaded periphery for the adjustable securement therein. A valve head is provided for sealingly engaging the valve seat by biasing means interposed between the valve head and valve base.

This invention further provides a valve body that is constructed and arranged for use with a flexible pressurized system, such as a pneumatic pipeline plug, and particularly provides a molded end cap structure for use in pneumatic plugs. The valve body provided yields an adjustable assembly that is integral an end cap and which can be preset during manufacture and one which is tamper resistant in the field.

These and other benefits of this invention will become clear from the following description by reference to the drawings.

DESCRIPTION OF THE PREFERRED EMBODIMENT

Pressure relief valves exhibit certain functional characteristics or parameters under specific conditions and applications. Therefore, the use of a relief valve assembly must be determined in view of its operational parameters. For example, pressurized systems that are flexible and movable require that certain functional parameters for a pressure relief valve be provided. Important to the valve structures of this invention are the cracking pressure or the pressure at which the valve first responds to fluid pressure and its subsequent seating pressure or the pressure at which the valve reseats. Repeatability of these parameters is of great importance when pressure relief valves are used in flexible pressurized systems, such as pneumatic test plugs. Further, it is important in these applications to provide pressure relief valves which are adjustable so that a particular valve configuration can be used for various pneumatic plug sizes as well as for enabling the fine tuning or presetting of each valve structure that is installed in a particular pneumatic plug. For example, a particular end cap assembly having the valve elements of this invention may be used for various pneumatic plug sizes, i.e., plug diameters usable in a range of 3–8 inches. Importantly, the functioning parameters of the pressure relief valve assemblies of this invention are preset at the place of manufacture or assembly and are tamper resistant in the field.

Figure 1:
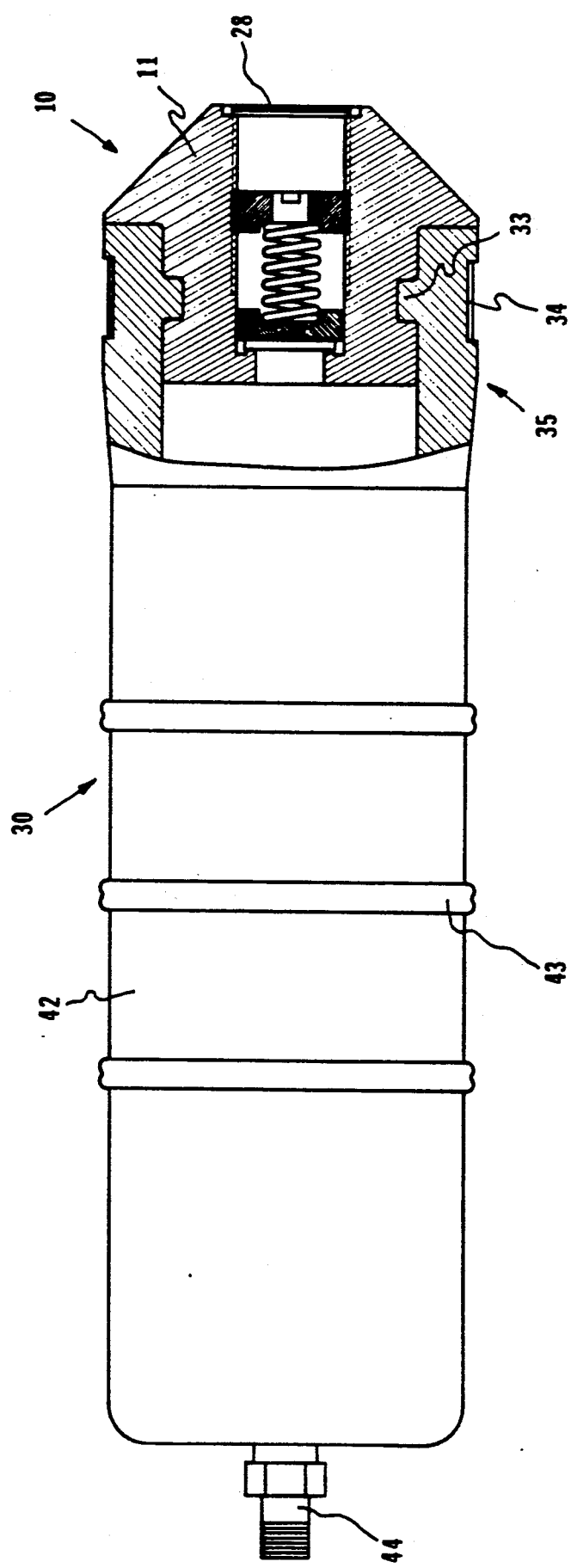
FIG. 1 is a lateral view, partially in section, showing the pressure relief valve end cap assembly of a pneumatic plug.

FIG. 1 shows a pressure relief valve assembly 10 incorporated in the forward end 35 of a pneumatic test plug 30. The pneumatic plug 30 has an elastomeric sleeve 42 with circumferential ribs 43 and an inflater assembly 44. The introduction of a pressurized fluid into inflater 44 causes the sleeve 42 to expand to seal the plug 30 in a pipe. A fluid pressure gauge is used to monitor the plug during inflation. The pressurized fluid introduced can be compressed air or a pressurized liquid such as water. Further, a garden hose adapter can be attached to the inflater assembly 44 so that a common water source can be used for plug inflation.

Figure 2:
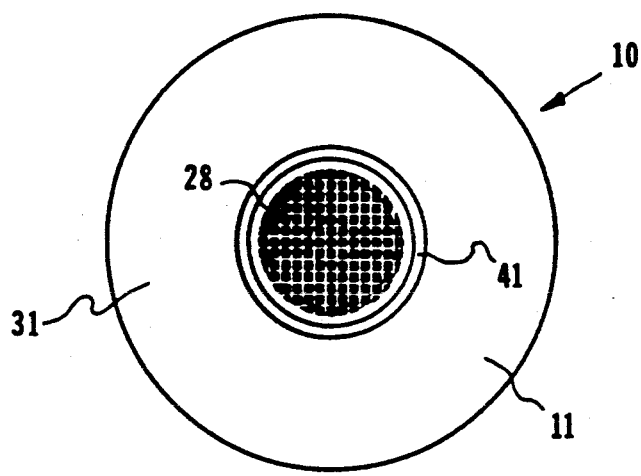
FIG. 2 is a frontal view of the pressure relief valve assembly of FIG. 1.
Figure 3:
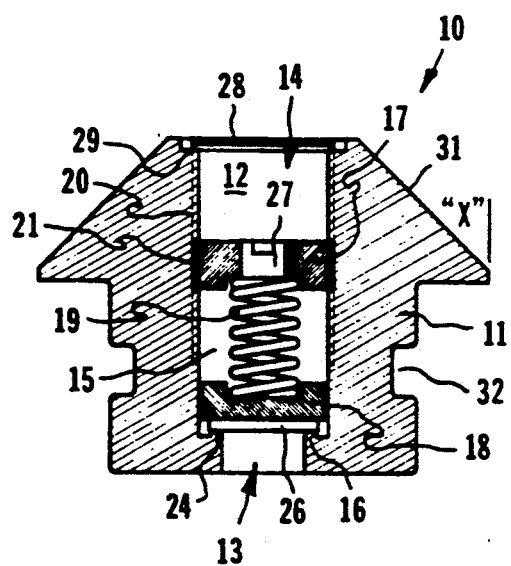
FIG. 3 is a cross-sectional view of the pressure relief valve of this invention.
Figure 4:
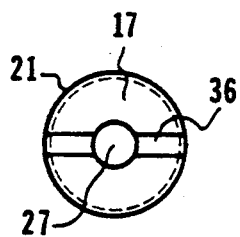
FIG. 4 is a top view of the adjustable base of the pressure relief valve.
Figure 9:
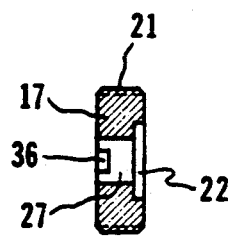
FIG. 9 is a sectional view of the adjustable valve base of FIGS. 4 and 5.
Figure 5:
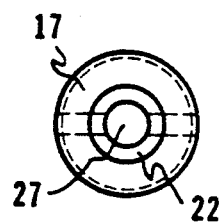
FIG. 5 is a bottom view of the adjustable base of FIG. 4.

Referring to FIGS. 1–3, the pressure relief valve assembly 10 is shown having a valve body 11 which is constructed and arranged to function as an end cap structure for the pneumatic plug 30. The valve body 11 is constructed and arranged to function as an end cap structure for the pneumatic plug 30. The valve body 11 has a circumferential groove 32 which receives the mating internal rib portion 33 of the pneumatic plug sleeve 42. A tightening strap 34 and associated fastening member are used to secure the pressure relief valve assembly 10 in the forward end 35 of pneumatic plug 30. Alternatively, the end cap body 11 can be adhesively secured in the forward end 35.

The valve body 11 has a passage 12 which extends axially therethrough and which has internal threads 20 to adjustably receive a valve base 17. The passage 12 has an inlet end 13, an outlet end 14 and a valve chamber 15 therebetween. The valve chamber 15 is shown to begin at the inward termination of the inlet end 13 and to have a diameter greater than that of the inlet end diameter. The forward end of the end cap valve body 11 is shown to have a conical front end 31 having an angle "X" of approximately 45 degrees with respect to a line parallel to the valve body flow-through axis or axial passage.

Although the sloped conical front end of the end cap structure is shown to have an angle of approximately 45 degrees, this angle may vary from 30–70 degrees, for example, depending upon the size and shape of the pneumatic test plug in which it is incorporated. The conical end configuration aids in the insertion and use of the pneumatic plug by permitting the easy insertion and manipulation of the plug in pipeline structures. Thus, end cap configurations having truncated hemispheric or parabolic shaped ends are also usable and are within the purview of this invention.

FIG. 2 shows a top view of the pressure relief valve assembly 10 and shows screen member 28 integrally mounted into the outlet end of valve body 11. The screen member 28 is adhesively fixed, for example, into a circumferential recess or ledge 29 adjacent the end face 41 of the end cap body 11. The screen member 28 protects and maintains the interior structure of the pressure relief valve assembly 10 in a clean environment and provides tamper resistance to the operation of the valve assembly 10.

FIGS. 3–5 and 9 show the adjustable valve base 17 having external circumferential threads 21 which engage the internal threads 20 of the central passage 12 of the valve body 11. The adjustable member 17 has an adjustment slot 36 which can be used to turn the threaded body 17 to thereby secure the member 17 in the threaded passage 12. Although an adjustment slot 36 is shown, any other shaped indentation into the top of the valve base 17 may be utilized to provide this adjustability feature. For example, any shaped slot or indentation that is usable with an adjustment tool to turn the valve base 17 may be used. The adjustable placement of the valve base 17 in the outlet end 14 of passage 12 permits the adjustment of the compression on the spring 19 so that the pressure relief valve 10 can be adjusted as to its functional operation during assembly. The valves of this invention are typically preset at about 35–60 p.s.i.g. during assembly so that any over-inflation from an 80 p.s.i.g. pressure source, for example, is expelled through the pressure relief valve assembly 10.

Figure 6:
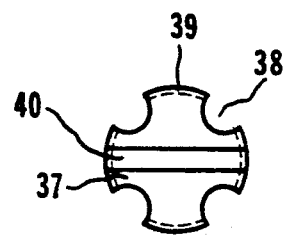
FIG. 6 is a bottom view of an alternate embodiment of the valve base of the pressure relief valve.

The adjustable valve base member 17 has a central aperture 27 which extend through the valve base 17 to permit the egress flow of excess fluid pressure, such as compressed air or water. FIG. 6 shows an alternate valve base 37 having a plurality of circumferentially placed apertures or ports 38 which permit a greater flow of fluid therethrough so that the pressure relief valve 10 can more quickly respond to increased pressures of the water or air. The valve base 37 further has external threads 39 for adjustability in the central passage 12. And, slot 40 is provided so that the valve base 37 can be adjusted with respect to the internal threads 20 so that the compression spring 19 yields the proper cracking pressure for the valve assembly. As discussed with respect to valve base 17, other adjustment means may also be utilized.

Figures 7, 8:
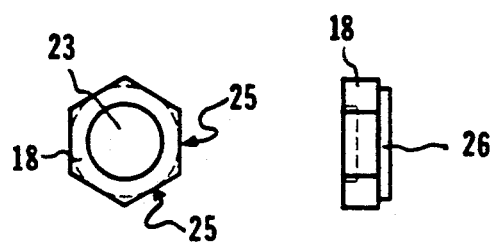
FIG. 7 is a top view of the valve head body of the pressure relief valve.
FIG. 8 is a lateral view of the valve head body of FIG. 7.

FIGS. 3, 7 and 8 show the valve head 18 used at the inlet end 13 and having an elastomeric seat member 26. The valve head 18 moves within the valve chamber 15 in response to over-inflation or that exceeding the preset pressure at the inlet end 13. The compression spring 19 is shown positioned between the valve base 17 and the valve head 18 and is secured within their respective cavities 22 and 23. Although opposing cavities 22 and 23 are shown utilized to hold or captivate the spring 19, other means to effectuate this result may also be utilized. For example, raised central portions extending from the valve base 17 and valve head 18, respectively, may be used for extension into the ends of the spring 19 to, thereby, captivate and hold the spring 19.

The compression spring 18 can, for example, be constructed of plated music wire to resist corrosion. For purposes of use in relief valves for pneumatic plugs described herein, a spring 18 having a spring rating of approximately 48 lbs./inch has been found suitable. The elastomeric member 26 may be constructed of natural rubber, neoprene, or the like having a Shore A Durometer range of 50–55. The elastomeric member 26 can be adhesively fixed or mechanically fastened to the valve head 18. FIGS. 7 and 8 show the valve head 18 having a hexagonal configuration which when positioned in the circular passage 12 defines a plurality of peripheral fluid flow passages 25. Thus, as the elastomeric member 26 is forced from valve seat 16 due to excess fluid pressure, the fluid is able to pass through the peripheral passages 25, through the valve chamber 15 and out through the aperture 27 of valve base 17 or, alternatively, out through the external ports 38 of the valve base 37 of FIG. 6.

Importantly, the valve head 18 is shown to be in close proximity to the orifice or inlet end 13 of the pressure relief valve assembly 10, and this configuration and placement has been found to provide a responsive pressure relief valve structure which permits high fluid flow characteristics for a relatively small valve area. A valve seat 16 is provided at the inlet end 13 and which is circumferentially positioned in the central passage 12 to define the valve chamber 15. The valve seat 16 is shown having a rounded annular periphery 24. This annular periphery 24 may also be elliptical or parabolic in cross-section or have a triangulated cross-section so as to provide a peripheral line of concentration for the elastomeric member 26.

In summary, the pressure relief valve assemblies 10 of this invention are relatively inexpensive in that the valve bodies 11 are preferably constructed of a molded plastic, i.e., injection molded of ABS plastic, are easily assembled and adjusted and are constructed and arranged for use in flexible pressurized systems, particularly for pneumatic test plugs. The pressure relief valves 10 of this invention exhibit high flow characteristics and can easily be made integral with pneumatic plug structures by utilizing the end cap valve body 11. Further, the compression spring 19 is used in cooperation with an adjustable member valve base structure 17 which permits the adjustability for presetting the functional parameters of the pressure relief valve structure.

As many changes are possible to the embodiments of this invention utilizing the teachings thereof, the descriptions above, and the accompanying drawings should be interpreted in the illustrative and not the limited sense.

That which is claimed is:

1. A pressure relief valve and a pneumatic plug having an elastomeric sleeve and a forward end, comprising:
   (a) a valve body constructed and arranged for the immovable securement in the forward end of said pneumatic plug sleeve, said valve body having an axial passage, an inlet end, an outlet end and a valve chamber, said valve body further having a generally T-shaped cross-sectional configuration with a sloped top surface;
   (b) a fixed valve seat located at the inlet end of said valve body;
   (c) an adjustable valve having a valve base with means to adjustably fix said base in said passage, said valve base further having at least one aperture therethrough, a moveable valve head and biasing means interposed between said valve head and said valve base, said valve head being movable into sealing engagement with said fixed valve seat to control the flow of fluid through said valve body; and
   (d) means to immovably fix said valve body in said sleeve forward end rearward said T-shaped body sloped surface.

2. The relief valve of claim 1, wherein said valve body has a threaded passage portion, wherein said adjustable valve base has a threaded exterior for the adjustable placement in said threaded passage portion, and wherein said biasing means is a compression spring.

3. The relief valve of claim 1, wherein said valve body inlet end is smaller in cross-section than that of said valve chamber, and wherein said fixed valve seat has a annular seat integral said valve body inlet.

4. The relief valve of claim 1, wherein said moveable valve head has an elastomeric member fixed thereto for sealingly engaging said fixed valve seat.

5. The relief valve of claim 1, wherein said valve body has an annular recess at said outlet end, and wherein a screen member is fixed in said annular recess to provide tamper resistance to said relief valve.

6. The relief valve of claim 1, wherein said pneumatic plug foward end has an internal rib portion and wherein said valve body has an external circumferential groove for sealingly receiving said internal rib portion of the pneumatic plug sleeve.

7. The relief valve of claim 1, wherein said pneumatic plug has an operational pressure of 35-60 p.s.i.g., wherein said relief valve has a cracking pressure of approximately 45 p.s.i.g., wherein said biasing means is a compression spring, wherein said valve base and said valve head have means to captivate said spring, and wherein said valve head has at least one peripheral opening outside the contact area with said valve seat.

8. An adjustable pressure relief valve structure and a pneumatic plug having a sleeve with a forward end and means to immovably secure said adjustable pressure relief valve structure therein, comprising a valve body constructed and arranged as an end cap body structure for immovable securement in said pneumatic plug, said valve body having an axial passage terminating in inlet and outlet ends and including a valve chamber between said inlet and outlet ends, an annular valve seat about said passage at said inlet end, a valve base having at least one aperture therethrough adjustably secured in said passage proximate said outlet end, a valve head for sealingly engaging said valve seat and adjustable biasing means capture between said valve head and said valve base, said end cap body structure being formed of a molded plastic and having a conical exterior surface sloping downward from said outlet end, said pneumatic plug sleeve being immovably secured rearward said cap body structure sloping surface.

9. The pressure relief valve of claim 8, wherein said axial passage includes a threaded interior surface, and wherein said valve base has a threaded exterior periphery for the adjustable securement therein.

10. The pressure relief valve of claim 8, wherein a screen member is mounted at said passage outlet end of said valve body to provide tamper resistance to said relief valve.

11. The pressure relief valve of claim 10, wherein said valve body has an annular peripheral ledge about said passage outlet end and wherein said screen member is mounted therein.

12. The pressure relief valve of claim 8, wherein said pneumatic plug has an operational pressure ranging from 35 to 60 p.s.i.g., and wherein said valve has a cracking pressure of approximately 45 p.s.i.g..

13. The pressure relief valve of claim 8, wherein said end cap structure has an exteriorly disposed circumferential groove therein, said means to secure further comprising an inwardly protruding circumferential rib from the pneumatic plug sleeve for mating engagement with said end cap body circumferential groove.

14. The pressure relief valve of claim 8, wherein said biasing means is a compression spring, and wherein said valve base and said valve head have means to captivate said spring.

15. The pressure relief valve of claim 8, wherein said valve body and passage have a circular cross-section, said valve seat further comprising a rounded annular seat, said passage further having a valve chamber having a diameter larger than said inlet end, said valve head having an elastomeric member fixed thereto for sealingly engaging said valve seat and wherein said valve head has at least one peripheral opening outside the contact area with said valve seat.

16. In a pneumatic test plug having an elastomeric sleeve with a forward end, an adjustable pressure relief valve, comprising:
   (a) a valve body constructed and arranged for securement in the forward end of said sleeve, said sleeve further having an inner protruding circumferential rib disposed at said forward end;
   (b) said valve body having an axial passage terminating in inlet and outlet ends and including a valve chamber between said inlet and outlet ends, and annular valve seat about said passage at said inlet end, a valve base having at least one aperture therethrough adjustably secured in said passage, a valve head for sealingly engaging said valve seat and adjustable biasing means captured between said valve head and said valve base, said valve body further having an outer groove for matingly receiving said protruding rib of said sleeve forward end; and
   (c) means to secure said valve body in the forward end of said pneumatic test plug sleeve.

17. The adjustable pressure relief valve of claim 16, wherein said pneumatic plug has an operational pressure ranging from 35 to 60 p.s.i.g. and wherein said valve has a cracking pressure of approximately 45 p.s.i.g.

18. The adjustable pressure relief valve of claim 16, wherein said valve body has a threaded passage portion, wherein said adjustable valve base has a threaded exterior and wherein said biasing means is a compression spring.

19. The adjustable pressure relief valve of claim 16, wherein said valve body has an annular recess at said outlet end and wherein a screen member is fixed in said annular recess to provide tamper resistance to said relief valve.

* * * * *